2 Sheets—Sheet 1.

M. ROSE.
Circular-Sawing Machine.

No. 196,707.      Patented Oct. 30, 1877.

Witnesses.
Otto Hufeland
Hugo Brueggemann

Inventor.
Morris Rose
by
Van Santvoord & Hauff
his attorneys.

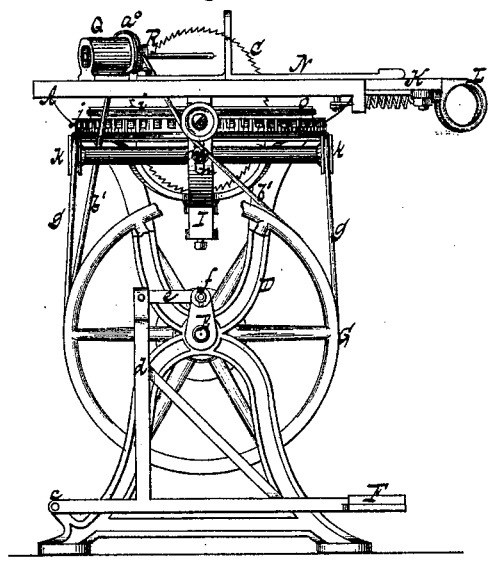

UNITED STATES PATENT OFFICE.

MORRIS ROSE, OF NEW YORK, N. Y.

IMPROVEMENT IN CIRCULAR SAWING MACHINES.

Specification forming part of Letters Patent No. 196,707, dated October 30, 1877; application filed September 22, 1877.

*To all whom it may concern:*

Be it known that I, MORRIS ROSE, of the city, county, and State of New York, have invented a new and useful Improvement in Sawing-Machines, which improvement is fully set forth in the following specification, reference being had to the accompanying drawing, in which—

Figure 1:
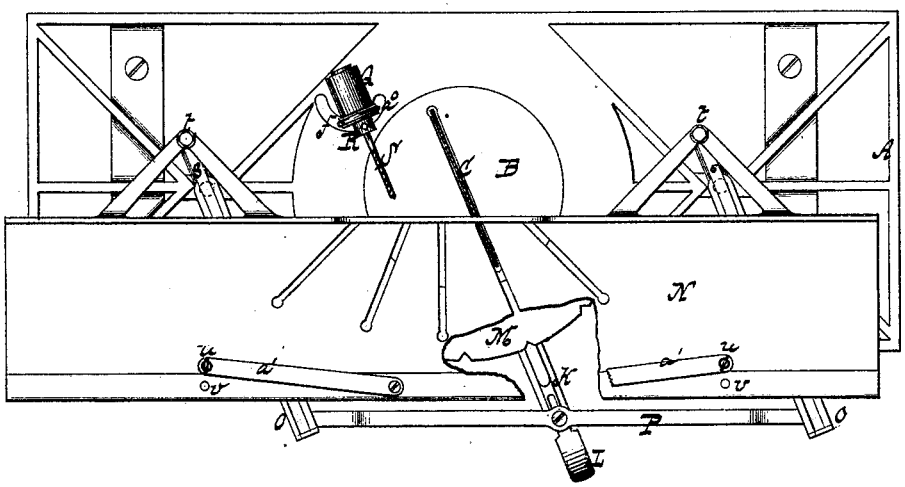
Figure 2:
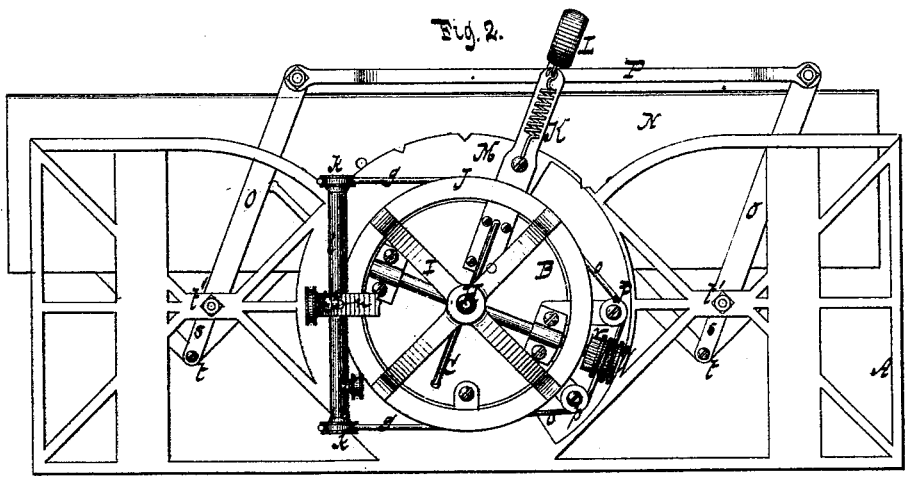

Figure 1 represents a plan or top view. Fig. 2 is an inverted plan. Fig. 3 is an end view.

Similar letters indicate corresponding parts.

This invention relates to an improvement in that class of sawing-machines for which a patent was granted to me April 10, 1877, No. 189,498, and in which the saw is mounted on a revolving carriage which is placed on a stationary table, and co-operates with a work-supporting bed that moves on the stationary table.

My present improvement consists in the combination, with the revolving saw-carriage and with the stationary table, of a notched disk or segment firmly attached to the table, a radial arm, and of a spring-latch connected to the saw-carriage, arranged to slide horizontally on the radial arm, and adapted to engage the notches in the disk or segment, for adjusting the position of the saw with ease and convenience. With the revolving saw-carriage, the stationary table, the latch for adjusting the saw-carriage, and the movable work-supporting bed are combined two guides which determine the direction in which the work-supporting bed moves, so that, by adjusting the saw-carriage, said guides are brought in the required position. With the guides, the work-support ing bed and the slides which move in the guides are combined set-screws for retaining the slides in position when the saw is adjusted for cutting the work off square. With the saw-carriage are combined a horizontal driving-shaft, a vertical arbor carrying a pulley, and a cog-wheel or another pulley, and two guide-pulleys mounted on a horizontal shaft, which can be adjusted up or down, so that the tension of the belt transmitting motion from the horizontal driving-shaft to the vertical arbor can be adjusted with ease and facility. With the saw-carriage and the work-supporting bed is combined a drill-spindle which receives a revolving motion from the driving-shaft, so that holes may be drilled parallel to the direction in which the saw cuts.

In the drawing, the letter A designates a table, which is made of cast-iron or any other suitable material, and which is provided with a circular recess to receive the carriage B that carries the circular saw C. This saw is mounted on an arbor that has its bearings in boxes, Fig. 2, which are firmly secured to the carriage B.

The table A is supported by legs D, which form the bearings for a horizontal shaft, E, to which a revolving motion is imparted by foot or any other suitable power. In the example shown in the drawing, the motion of said shaft is produced by means of a treadle, F, which swings on the ends of a rod, $c$, and from which rise standards $d$, which connect, by rods $e$, with cranks $f$ mounted on the ends of the horizontal shaft, Fig. 3. On this horizontal shaft is mounted a grooved pulley, G, from which motion is transmitted to a vertical arbor, H, by means of a belt, $g$. The vertical arbor H has its bearings in a hanger, I, secured to the table A, and on it is mounted a ring, J, which is provided with two circular grooves, $h$ $i$, and with cogs $j$. (See Fig. 3.)

The belt $g$ extends from the pulley G, over guide-pulleys $k$, round the groove $h$, in the ring J, and said guide-pulleys are mounted on a horizontal shaft, $l$, which is secured to one of the arms of the hanger I by a set-screw, $m$, which extends through a slot, $n$, so that said shaft can be raised or lowered, and the tension of the belt $g$ can be adjusted. From the groove $i$ in the ring J extends a belt, $o$, over guide-pulleys $p$, Fig. 2, round a pulley, $q$, mounted on the saw-spindle. On this spindle is also mounted a pinion, $r$, which can be thrown in gear with the cogs $j$ of the ring J, and if this pinion is used the belt $o$ can be dispensed with.

From the carriage B extends a radial arm, K, which supports a spring-latch, L, the tapering head, Fig. 1, of which engages with a notched segment, M, that is firmly secured to the table A. By means of this latch and the notched segment the saw-carriage is adjusted in the desired position.

On the table A is placed a movable bed, N, which is intended to support the work during the operation of cutting. This bed is provided with dovetailed slides s, which are connected to the same by pivots t, and which move in guides O, the inner ends of which are connected to the table A by pivots t', while their outer ends are connected together by a rod, P, which is attached to the latch L. By moving the latch, therefore, the guides O and the slides s are adjusted simultaneously with the saw-carriage, and the direction in which the work-supporting bed can be moved corresponds to the position of the saw.

When the saw is adjusted at right angles toward the work-supporting bed, said bed must be steadied by set-screws u, which are made to pass through holes v in the bed, and which screw into the guides s. These set-screws are secured in spring-arms a', which are pivoted to the bed N, so that they can be moved into or out of their working position.

On the table A is secured a head, Q, which forms the bearing for a hollow spindle, R, in which is secured a drill, S. On the hollow spindle R is mounted a pulley, a, over which passes a belt, b', which extends around a pulley on the driving-shaft. The head Q is intended to be made adjustable, so that its position can be made to correspond to that of the saw.

By this arrangement I am enabled to drill holes into the work at the same time it is being cut off.

In order to impart to the belt o the proper tension, one or both of the guide-pulleys p may be made adjustable.

What I claim as new, and desire to secure by Letters Patent, is—

1. In combination with the revolving saw-carriage B, stationary table A, and fixed disk or segment M, having a series of notches in its outer edge, the radial arm K and horizontal spring-latch L, connected with the saw-carriage, and arranged to slide on the radial arm to engage and disengage the notches in the outer edge of the disk or segment, substantially as and for the purpose described.

2. The combination, with a revolving saw-carriage, a stationary table, a latch for adjusting the saw-carriage, and a movable work-supporting bed, of two hinged guides which determine the direction in which the work-supporting bed moves, substantially as and for the purpose set forth.

3. The combination, with the saw-carriage, of a horizontal driving-shaft, a vertical arbor carrying a pulley and a cog-wheel, or another pulley, and two guide-pulleys mounted on a horizontal shaft which can be adjusted up or down, substantially as and for the purpose shown and described.

4. The combination, with the revolving saw-carriage and the work-supporting bed, of a drill-spindle which receives a revolving motion from the driving-shaft that imparts motion to the saw, substantially as and for the purpose set forth.

In testimony that I claim the foregoing I have hereunto set my hand and seal this 18th day of September, 1877.

MORRIS ROSE. [L. S.]

Witnesses:
W. HAUFF,
E. F. KASTENHUBER.